April 12, 1932. T. H. SANDOW 1,853,580
VEHICLE PARKING INDICATOR
Filed May 16, 1931
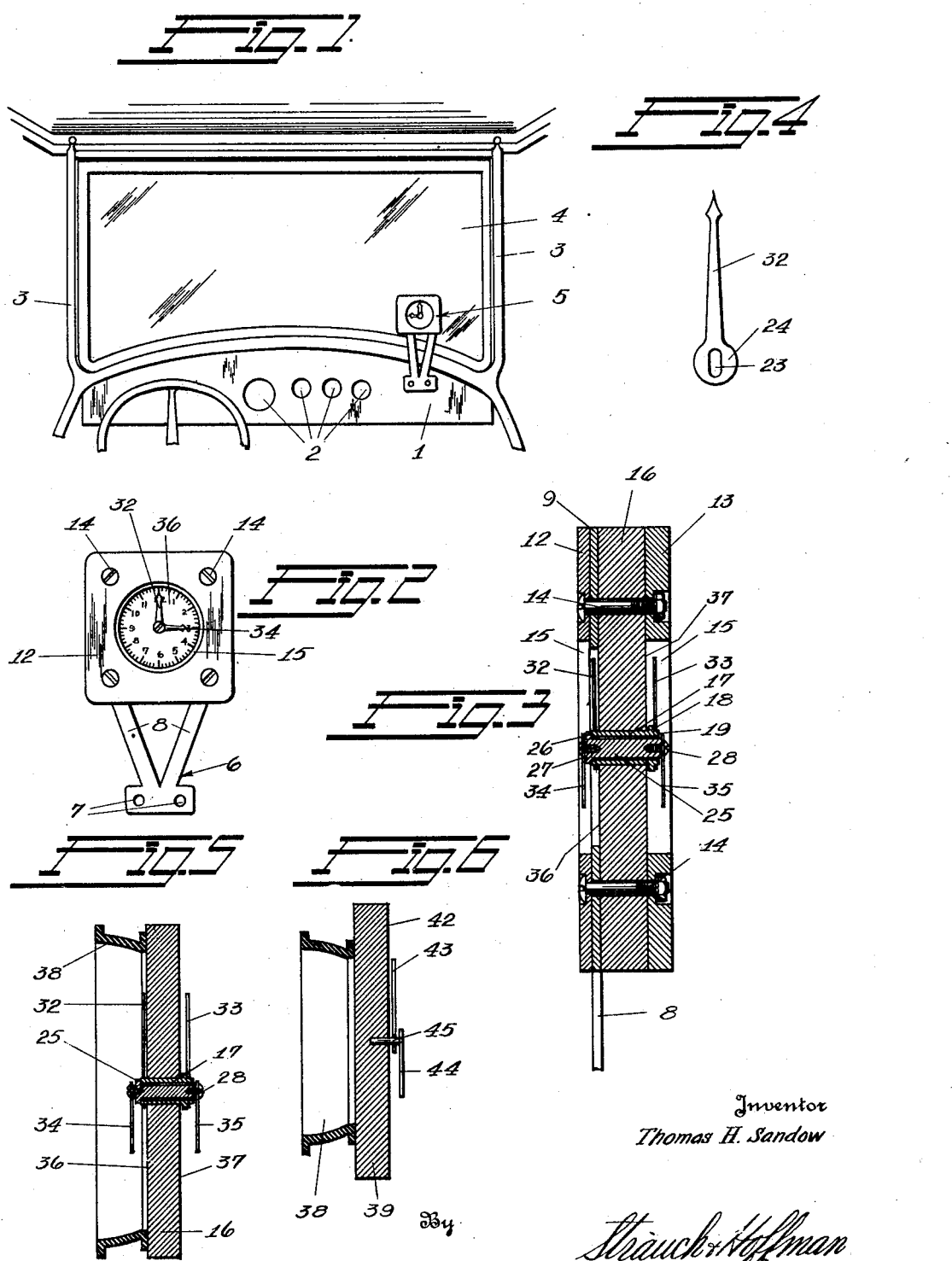
Inventor
Thomas H. Sandow
By
Strauch & Hoffman
Attorneys Patented Apr. 12, 1932

1,853,580

UNITED STATES PATENT OFFICE

THOMAS H. SANDOW, OF WILKES-BARRE, PENNSYLVANIA

VEHICLE PARKING INDICATOR

Application filed May 16, 1931. Serial No. 537,962.

This invention relates to a method and apparatus for indicating the length of time that a vehicle has been parked.

Practically all cities and municipalities today have various regulations restricting the length of time that vehicles such as automobiles may be parked on the streets. In most cities the time for parking varies in accordance with the locality. For example, in the down town or business sections the time allowed for parking may be one hour, and in less congested sections the time may be two hours, whereas in the residential districts the parking time may be unlimited. Great difficulty has been experienced in enforcing the parking regulations, since many automobiles are parked within the restricted zone beyond the time allowed by law.

In order to apprehend these violators of the city laws, various expedients have been resorted to, the most common requiring the actual presence of an officer of the law who will time the vehicle by noting the time it was first parked and if the parking extends beyond the allowed period. To effectively time the parked cars in a city in the above manner obviously requires the services of a great many officers.

One object of the present invention therefore is to provide a parking indicator for attachment to automobiles or other vehicles which will indicate at a glance the time that a vehicle has been parked.

Another object of the present invention is to provide a parking indicator for attachment to automobiles which is adapted to be manually set in accordance with the time that the vehicle is parked and which will therefore indicate to an officer the elapsed time by comparison with a watch or clock.

Another object of the invention is to provide a parking indicator for automobiles which is arranged in such position that it can be readily observed from a distance and exterior of the vehicle, and yet which may not be tampered with or moved by persons other than the owner of the vehicle.

Another object of the present invention is the provision of a parking indicator for automobiles which is extremely simple in construction and cheap to manufacture and which may be readily installed in an accessible position without interfering with the operating parts of the vehicle nor with the view of the riders therein.

In many congested localities garages or open lots are utilized as parking spaces for automobiles, the owners of the garages or lots charging the operators of the automobiles in accordance with the time that the vehicles are parked. Disputes frequently arise between the owners of automobiles and the operators of these garages or lots as to the parking time. Also to correctly time a multiplicity of vehicles which enter at different times and leave at different times now requires a written record for each vehicle.

A further object of this invention therefore is the provision of a system of timing vehicles parked in garages or other spaces where charges are made in accordance with the time of parking in which an indicator may be set by each automobile owner, and which may be readily attached to each vehicle to clearly show the time of parking when the owner re-claims his automobile.

A further object of this invention is the provision of a system of timing and a parking indicator for use in said system whereby a manually adjustable indicator may be set by or in the presence of the automobile owner and then locked in the closed body of a parked car by the owner thereof so that it may not be moved until the owner opens the car, the elasped time then can be easily calculated.

A further object of this invention is to provide a simple and cheap indicator having a clock face and manually movable hands and including a suction cup to attach it to an automobile for use in garages and parking spaces whereby one indicator may be manually set and attached to each car as it is parked, and the parking time may be readily computed when the car owner re-claims his car.

A further object of this invention is the provision of a system of timing parked vehicles whereby an accurate and readily available timing record is easily kept for each vehicle without requiring written records of the time of entering and leaving the parking space.

These and other objects of the invention will be apparent from the following description and the appended claims when taken in conjunction with the accompanying drawings wherein:

Figure 1 is a view of one embodiment of this invention attached to an enclosed automobile and viewed from the interior thereof.

Figure 2 is an elevation of the opposite face of the indicator shown in Figure 1 on a slightly larger scale.

Figure 3 is a vertical section on an enlarged scale taken through the indicator of Figures 1 and 2.

Figure 4 is a view of one of the indicator hands.

Figure 5 is a sectional view of another embodiment of the invention embodying a suction cup for attaching to a vehicle.

Figure 6 is a sectional view of a single dial indicator embodying a suction cup.

Referring to the drawings wherein like reference characters indicate like parts, one embodiment of my novel indicator is shown in Figure 1 as attached to the instrument panel of an automobile having an enclosed body. The instrument panel 1 is provided with the usual instruments 2, and the corner brackets 3 for supporting the windshield 4 and the top in the usual manner. The novel parking indicator 5 constituting the present embodiment is mounted on the instrument panel adjacent one end thereof and projects upwardly whereby the face of the same may be clearly viewed through the windshield 4.

As indicated more clearly in Figures 2 and 3, my novel indicator embodies a supporting bracket 6 including a bottom strap having openings 7 therein for securing bolts, and having upwardly extending divergent arms 8 to which are secured the indicating mechanism. The upper ends of arms 8 carry supporting head 9 having a rectangular or circular opening for providing a rigid framework to which the indicating mechanism may be secured.

Secured to the frame 9 are the front and back members 12 and 13 having suitable holes therein for alignment with corresponding holes in the head 9 for the reception of locking bolts 14. The two members 12 and 13 have the bolt holes enlarged at opposite ends whereby the heads of the bolts and the nuts are positioned below the surface of members 12 and 13. Each of the members 12 and 13 is provided with a circular recess 15. The dial and hand supporting base 16 is secured against the face of support 9 by member 13, the base 16 being apertured for the reception of bolts 14. Member 16 has a central opening in which is positioned the supporting members for the indicating hands of the parking device. A sleeve 17 has an external diameter to have a working fit with the opening in the supporting member 16 and is provided with a flange 18 adjacent one end thereof. Each end of the sleeve 17 has a boss 19 provided with a flat portion adapted for the reception of an indicating hand. The indicating hands are similar in construction, one hand being shown in Figure 4. As illustrated, the hand 32 has an opening 23 in the hub 24 thereof, opening 23 being substantially circular with two straight sides for engagement with the flat portions of the bosses 19. Sleeve 17 has a plain unthreaded opening throughout its length.

Within sleeve 17 is a second sleeve or bearing post 25. The two sleeves may be rotated with respect to one another. Sleeve 25 has flange 26 adjacent one end and is also provided with projecting bosses 27 having flattened portions thereon similar to bosses 19 of the sleeve 17. Each end of the sleeve 25 is threaded for the reception of screws 28.

The sleeves 17 and 25 are assembled as shown in Figure 3. The sleeve 17 is first positioned through the opening in supporting member 16 and then the two minute hands 32 and 33 are forced over the bosses 19. The flattened surfaces of the bosses 19 and the parallel edges of the openings 23 in the hands cooperate to prevent slipping of the hands and frictional engagement of the parts is sufficient to retain the hands in position. Then the inner sleeve 25 is slipped into the sleeve 17 and the two hour hands 34 and 35 are connected to the bosses 27, after which the screws 28 may be secured into position, preferably with washers beneath the heads.

The supporting member 16 has two indicating dials 36 and 37 having numerals arranged thereon similar to the face of a clock. However it will be noted from Figures 1 and 2 that the dials are arranged with their figures progressively increasing in opposite directions.

As indicated in Figure 1, the parking indicator is preferably located in a portion of the automobile wherein one of the dials with its cooperating hands may be clearly viewed from the exterior of the vehicle, and the other may be viewed from the interior thereof. One convenient and preferred location of the indicator is shown in Figure 1, wherein the indicator may be viewed through the automobile windshield. With the device thus installed, the operator of the vehicle will set the hour and minute hands of the parking indicator at the time the vehicle is parked. For example if the vehicle is parked at three o'clock the hour hand is turned by hand to the numeral 3, and the minute hand is turned to the numeral 12 as shown on the drawings. Rotation of the hour hand 34 causes simultaneous rotation of the inner sleeve 25 carrying with it the opposite hour hand 35. Similarly rotation of the minute hand 32 causes rotation of the outer sleeve 17 thus rotating the opposite minute hand 33. The hands are thus simultaneously set on both dials 36 and 37 to clearly indicate to persons within and outside the automobile the time at which it was parked.

Each operator of a vehicle may be required by municipal or city ordinances to indicate the exact time at which a vehicle is parked. Furthermore such ordinances may make it unlawful to set the indicator at any other than the actual time at which the vehicle was parked. With each vehicle equipped with these indicators and each indicator clearly showing the time that the vhicle was parked, obviously an officer could tell at a glance whether the vehicle had been parked longer than allowed by law in the particular zone. Thus one officer could cover much more territory than under the present system.

It will be obvious that the novel parking indicator may be mounted in various other positions in the vehicle, the principle requirement being that the hands are readily accessible for positioning by the operator of the vehicle and that the dials and hands are visible from the exterior thereof.

In the embodiment illustrated in Figure 5, a readily detachable mounting is shown, wherein the indicator is provided on one face with a flexible rubber suction cup 38 whereby it may be readily attached to the glass of the windshield of an automobile or to a window thereof, either on the interior of the closed body or exterior of the body. In either mounting the dial and hands within the suction cup are clearly visible through the cup and the glass.

The form of invention shown in Figure 5 wherein the parking indicator may be readily attached to an automobile is also useful where someone other than the operator of the vehicle attaches the parking device to the vehicle. For example in various congested localities such as the business sections of the city, various garages and open air parking places are provided in which vehicles may be parked. The charges for parking in these garages or parking spaces usually depends upon the length of time that the vehicle remains parked. With the form of invention shown in Figure 5 therefore when a machine is driven into a privately owned parking space, the attendant or the vehicle operator may manually attach by the suction cup 38 a parking indicator to the vehicle. He will then set the hands to indicate the actual time of parking, and when the operator returns the elapsed time during which the vehicle has been parked will be readily ascertained from the set parking indicator hand and the time. Thus the correct charges for the parking of the vehicle may be simply computed. In the case of closed automobiles, the indicator may be mounted within the car and set correctly, and the automobile owner may then lock the doors of the car whereby the indicator may not be re-set. Thus when the owner returns there can be no dispute as to the time of parking since the indicator could not have been tampered with.

In the form of invention shown in Figure 6 the indicator has been shown in a simplified form wherein the rubber suction cup 38 is mounted on the rear face of a block 39 embodying only one dial 42 supporting two hands on the adjacent face thereof. The two indicating hands 43 and 44 may be frictionally mounted on a center post 45 for manual independent adjustment. This form of the invention is particularly useful in parking spaces and garages or any other use wherein the necessity of viewing the indicator from two directions is avoided. The form of invention shown in Figure 6 may be very cheaply manufactured and sold to the operators of garages for parking spaces, for ready attachment to a vehicle as it is parked. When the owner reclaims his machine the actual time of parking is easily computed for each car without the necessity of keeping books or records. It will be understood that the embodiment shown in Figure 6 can also be set and then locked within an automobile, thus avoiding all possible disputes as to the indicator having been moved during the absence of the operator of the automobile, as described in connection with Figure 5.

It will be understood that my novel system of timing the parking of vehicles is not limited to the specific embodiments shown. Other modes of attaching the indicators to vehicles may be used and fall within the purview of the invention.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by U. S. Letters Patent is:—

1. A parking indicator comprising a supporting member, two indicating dials thereon and facing in opposite directions, indicia on said dials representing hours and minutes, said supporting member having an opening therethrough concentric with said dials, a bearing post passing through said opening and having its ends projecting beyond the two dials, an indicating hand secured to each projecting end of said bearing post for simultaneous rotation adjacent the two dials, a sleeve surrounding said bearing post and having its ends projecting beyond the two dials, an indicating hand secured to each projecting end of said sleeve for simultaneous rotation adjacent the two dials, and means for securing said indicator to an automobile with one dial visible from a distance.

2. The invention as defined in claim 1 wherein the projecting ends of said bearing post and sleeve have flat surfaces thereon, and said hands have similar shaped openings engageable over said ends.

3. The invention as defined in claim 1 wherein the means for securing the indicator to an automobile comprises a depending bracket, and means for securing said bracket to the instrument panel of the automobile with one dial of said indicator visible through the windshield thereof.

4. A parking indicator for automobiles comprising a supporting member, two oppositely facing dials thereon having indicia representing time intervals, and indicating hands cooperating with each dial, said hands being connected for simultaneous manual adjustment, and a hollow suction cup on said supporting member surrounding one dial and spaced beyond the dial whereby said indicator may be readily attached to a glass panel of an automobile with one dial visible through the glass and the hollow suction cup.

5. A parking indicator for automobiles comprising a supporting member, two dials on opposite faces thereof having indicia representing hours and minutes, two hour hands one cooperating with each dial, two minute hands one cooperating with each dial, a bearing post projecting through said supporting member and having both hour hands secured thereto, a sleeve surrounding said post and projecting through said member and having both minute hands secured thereto, and a hollow suction cup secured to said supporting member and surrounding one dial whereby one set of hands may be manually positioned to indicate the time a vehicle is parked and the suction cup then secured to the inner surface of the windshield of the automobile, one dial and hands being visible through the glass and the hollow cup.

In testimony whereof I affix my signature.

THOMAS H. SANDOW.